Jan. 6, 1953  C. E. NUTTALL  2,624,297
AUTOMATIC CAKE BAKING MACHINE
Filed Oct. 14, 1940  7 Sheets-Sheet 1

INVENTOR.
CHARLES E. NUTTALL,
BY
Shoemaker & Mattare
ATTORNEYS

Jan. 6, 1953     C. E. NUTTALL     2,624,297

AUTOMATIC CAKE BAKING MACHINE

Filed Oct. 14, 1949     7 Sheets-Sheet 7

INVENTOR.
CHARLES E. NUTTALL,
BY
Shoemaker & Mattare
ATTORNEYS

Patented Jan. 6, 1953

2,624,297

UNITED STATES PATENT OFFICE 2,624,297

AUTOMATIC CAKE BAKING MACHINE

Charles E. Nuttall, Sharptown, Md.

Application October 14, 1949, Serial No. 121,340

2 Claims. (Cl. 107—58)

The invention relates to an automatic cake baking machine.

An object of the invention is to provide an automatic cake baking machine capable of continuously baking cakes and other products in large quantities for commercial production.

A further object of the invention is to provide a cake baking machine capable of simultaneously baking cakes and other products from a plurality of different mixes separately and simultaneously discharged from a plurality of hopper outlets into a mold, and also baking from two different mixes discharged into the mold from a single hopper outlet to permit the use of two mixes in the same cake, whereby a variety of products may be simultaneously baked in the same mold.

A further object of the invention is to provide a cake baking machine having an endless mold conveyor arranged to carry molds after they have received a batch of mix from a hopper into and through an oven in which the mix is baked into cakes and which inverts the molds and conveys the same to a position outside the oven where the molds are automatically opened to discharge their contents.

Another object of the invention is to equip the baking machine with cooling trays automatically fed from a magazine and carried forwardly by a cooling tray conveyor to a receiving position beneath a discharging mold.

It is also an object of the invention to provide molds each having a hinged top section or cover locked in a closed position while the molds are traveling through the oven and while the mix is being baked, and automatically unlocked when each mold has been carried to a discharging position above a cooling tray arranged in a receiving position.

Another object of the invention is to provide a cake baking machine adapted immediately after a mold has received a batch of mix to close and lock the hinged top section or cover in a closed position and maintain the same locked while the mold is traveling through the oven and capable, after the mold has been carried out of the oven and has been opened and has discharged its contents, of locking and maintaining the mold in such open position until it has received another batch of mix, so that the mold in passing around the end of the conveyor in an open position will not be closed by gravity.

A further object of the invention is to provide a cake baking machine having an endless mold conveyor and an endless cooling tray conveyor operated from a single source of power which also operates means for supplying compressed air to conveyor controlled mechanism for automatically operating the mix depositor and the mechanism for automatically dropping onto the tray conveyor cooling trays from a stack contained in a magazine.

Another object of the invention is to provide a cake baking machine having an oven enclosing the major portion of the mold conveyor and provided with heating elements for baking the contents of the molds and having means for venting the oven for conveying away the fumes resulting from the baking of the mix contained within the molds.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 5 is a similar view taken on the line 5—5 of Fig. 3;

Fig. 33 is a detail vertical sectional view taken on the line 33—33 of Fig. 1.

Figure 2:
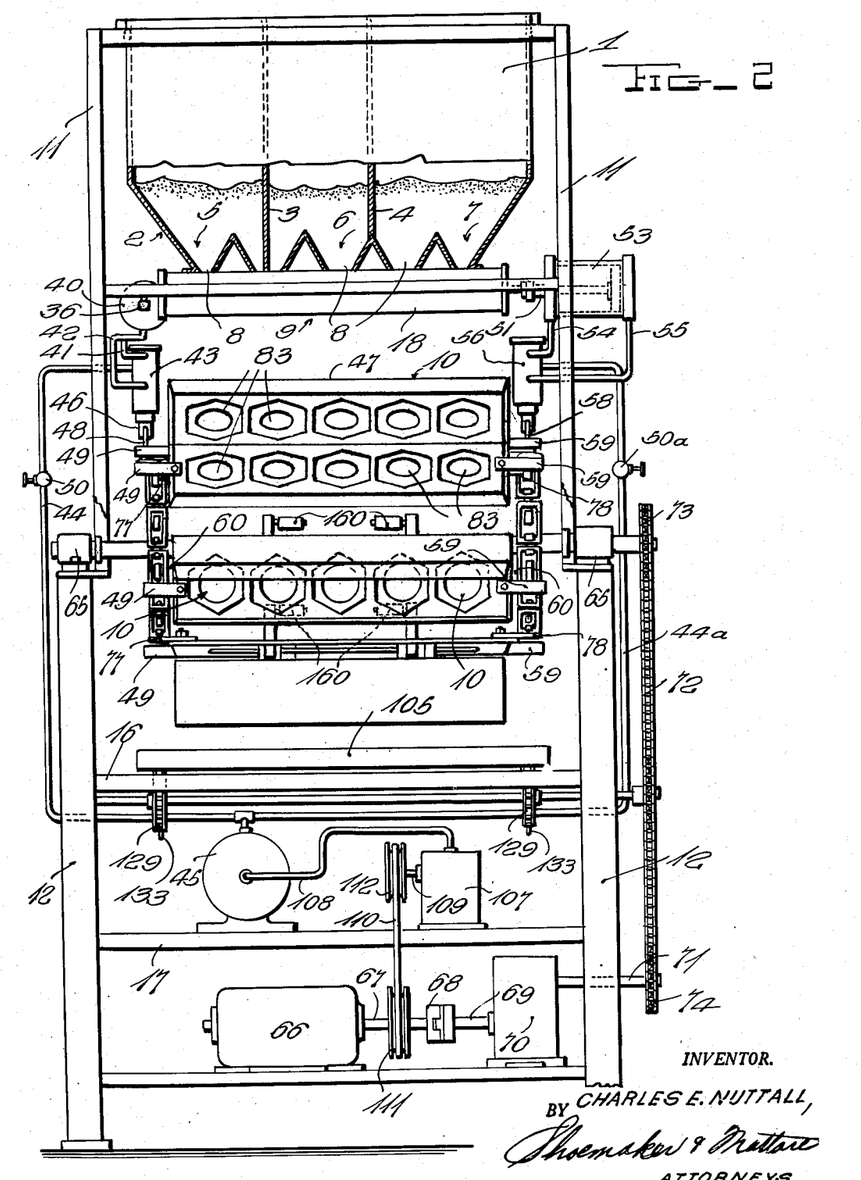
Fig. 2 is an end elevation.
Figures 2, 4, 6, 7, 8:
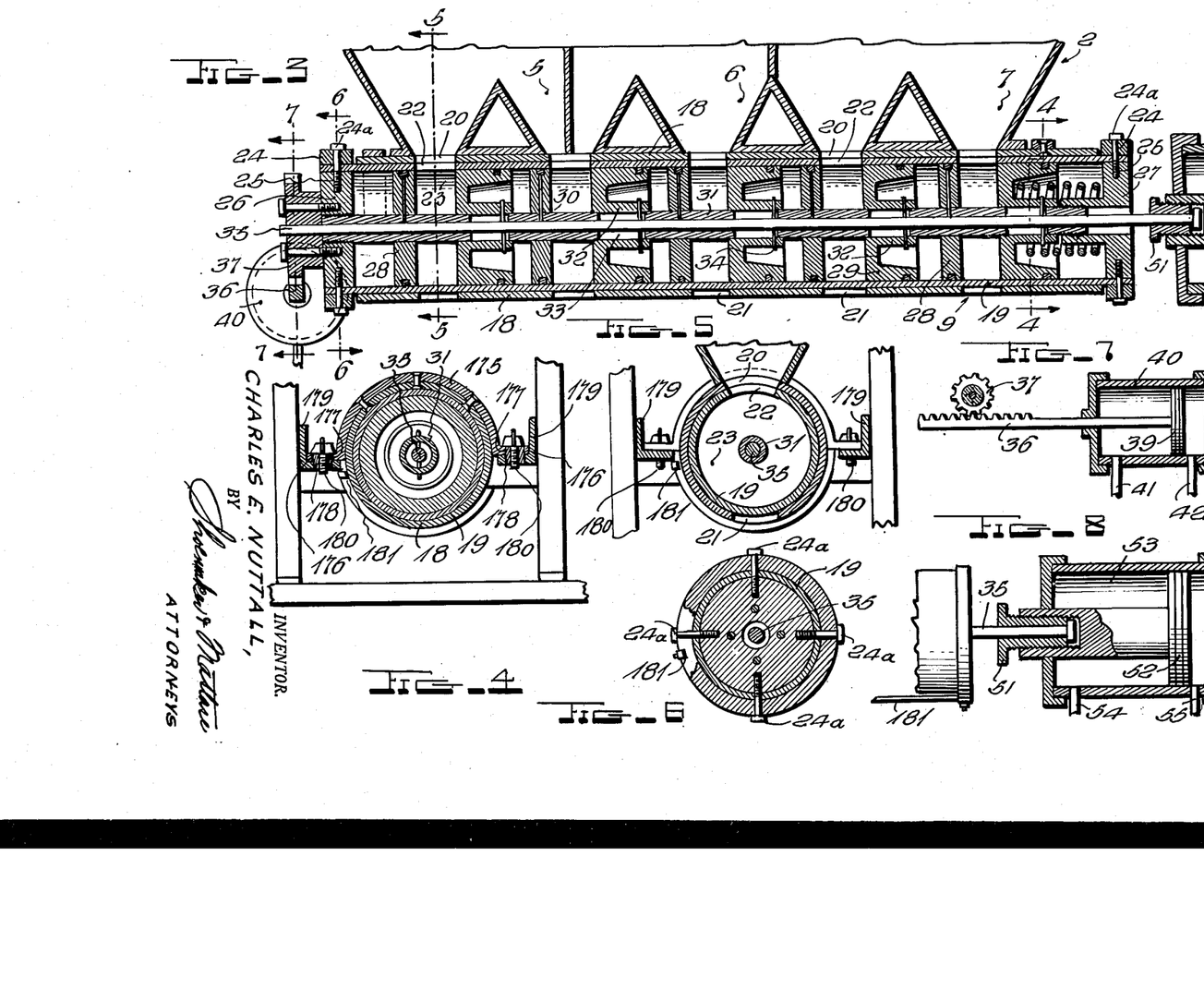
Fig. 4 is an enlarged detail transverse sectional view taken on the line 4—4 of Fig. 3.
Fig. 6 is an enlarged detail sectional view on the line 6—6 of Fig. 3.
Fig. 7 is a detail sectional view taken on the line 7—7 of Fig. 3.
Fig. 8 is an enlarged detail sectional view, partly in elevation, of the right-hand end portion of Fig. 3.

In the accompanying drawings, in which is illustrated one practical embodiment of the invention, the automatic cake baking machine comprises in its construction a hopper 1 having a tapered lower portion 2 and having vertical partitions 3 and 4 dividing the hopper into separate mix compartments 5, 6 and 7 adapted to contain a plurality of different mixes for cakes and similar products. The hopper is also provided at the bottom with a row of outlets 8 and is tapered at opposite sides of the outlets for discharging the mix into an automatic multiple soft cake mix depositor 9 which measures and deposits the mix into molds 10. Any number of partitions and compartments may be employed to provide a baking machine of the desired capacity and, as illustrated in Fig. 2 of the drawings, the partition 3 may be arranged at a point intermediate of the ends of an outlet 8 for permitting the mix of two compartments to be fed through the same outlet for use in the same cake. The mix feeds by gravity to the ports at the bottom of the hopper and into the depositor by suction, as hereinafter fully described. Any suitable pressure means may be provided, if desired, to supplement the gravity feed of the mix to the bottom ports of the hopper.

The hopper is suitably supported by uprights 11 of a main frame, preferably constructed of angle iron, but any suitable material may, of course, be employed. The main frame is provided with corner posts or uprights 12 and 14 connected by longitudinal horizontally disposed side bars 15 and upper and lower transverse connecting bars 16 and 17. Any other desired construction of the main frame or framework may, of course, be employed.

Figures 1, 3:
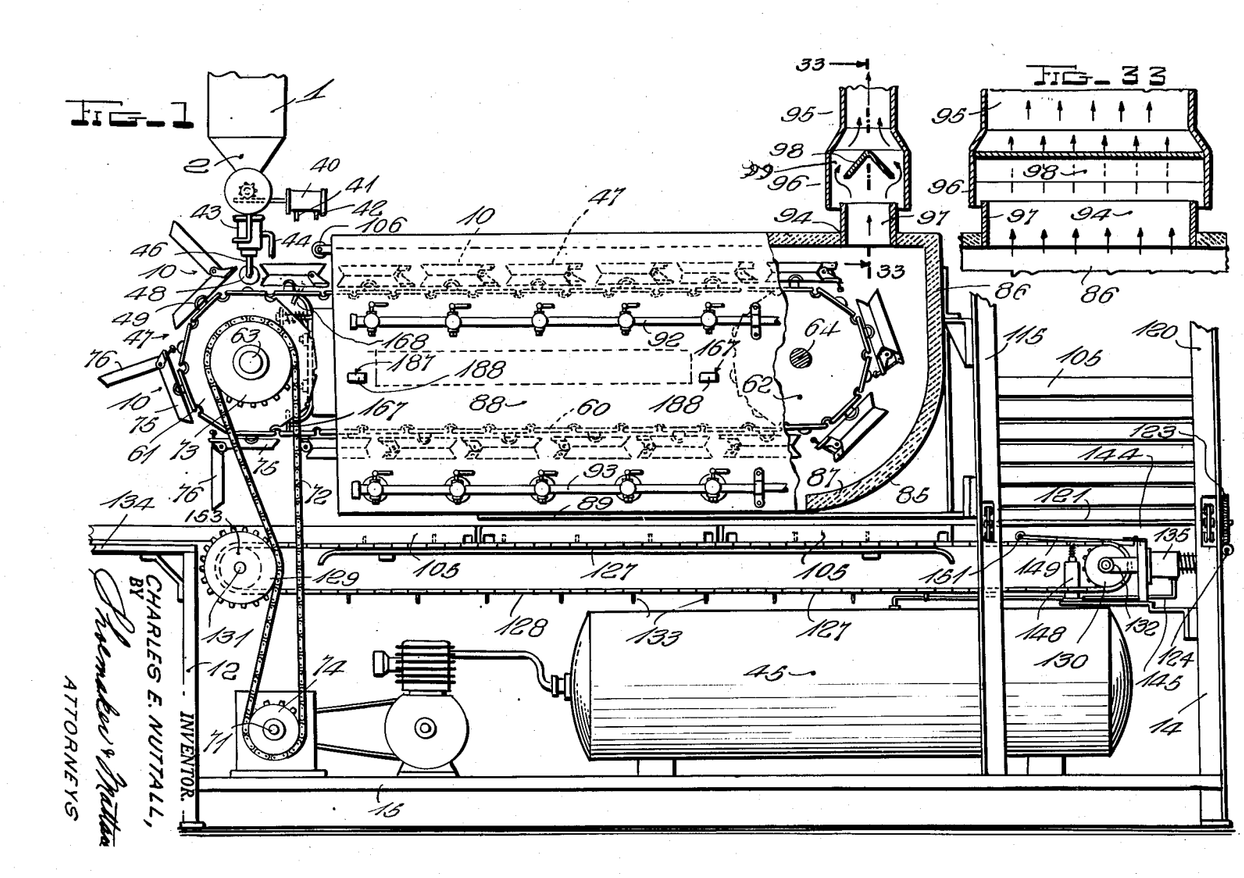
Fig. 1 is a side elevation of a cake baking machine, partly in section, constructed in accordance with the present invention.
Fig. 3 is an enlarged detail sectional view taken longitudinally of the mix depositor and showing a portion of the hopper.

The mix depositor comprises in its construction an outer cylinder 18 and an inner cylinder or sleeve 19 constructed of Monel metal, stainless steel or any other suitable material. The outer cylinder, which is provided at the top with inlet ports 20 and at the bottom with outlet ports 21, is attached to the hopper by rivets, spot welding or other suitable means and is supported beneath the hopper by brackets 175 constructed of suitable metal and having a substantially semi-circular body portion to conform to the configuration of the outer cylinder and having its terminal portions provided with holes 177 to permit the brackets 175 to be fitted over upwardly projecting studs 178 extending upwardly from transversely disposed angle iron bars or members 179 of the hopper-depositor supporting structure of the main frame. The studs are hollow and are provided with female threads for the reception of thumb screws 180. The brackets which are located adjacent the ends of the outer cylinder and which are arranged upon the upper portion thereof are secured to the same by spot welding or by any suitable means and the depositor is stoutly supported in position and is adapted to withstand the push and pull of the pistons of the air cylinders, as hereinafter described, and any pressure necessary for the operation of the mix depositor is available.

The inlet ports are arranged in alignment with the discharge outlets of the hopper and are alternately opened and closed by the inner sleeve 19 provided with one set of ports 22 which are carried by a rotary movement of the sleeve alternately into alignment with the inlet ports 20 and the outlet ports 21 of the cylinder to permit the mix to feed into separate compartments 23 of the inner sleeve and to discharge therefrom into the molds.

The inner cylinder or sleeve, which may be constructed of any suitable metal, is rotated one-half of a revolution by the means hereinafter described, and it is retained within the outer cylinder and held against longitudinal movement by means of collars 24 secured by screws 24ª to the ends of the inner cylinder which extend beyond the ends of the outer cylinder. The collars 24 are arranged in flush relation with the periphery of the outer cylinder and with the ends of the inner cylinder. The screws 24ª which pierce the collars and the extended ends of the inner cylinder engage threaded holes 25 in the peripheries of end heads 26 and 27 which are rigidly secured within the ends of the inner cylinder.

The compartments 23 are formed by intermediate heads 28 and piston heads 29 located at opposite sides of the ports 22 when the latter register with the outlet ports of the hopper. The intermediate heads consist of disks which are provided with central openings 30 and which are rigidly connected with a tubular piston rod housing 31 extending through the central openings of the intermediate disks and through central cylindrical hub portions 32 of the piston heads. The ends of the piston rod housing extend through and have a threaded connection with the end heads 26 and 27 and the said housing is provided intermediate of its ends with slots 33 through which pass pins 34 which connect the piston heads with the reciprocable piston rod 35, and permit the piston rod and the piston heads to be moved toward and from the intermediate heads 28. The piston rod, the tubular piston rod housing, the end heads, the intermediate heads and the piston heads are inserted in the inner cylinder or sleeve as an assembly and, with the inner cylinder or sleeve, turn as a unit when the inner sleeve or cylinder is rotated to carry its ports from the inlet ports 20 of the outer cylinder to the outlet ports 21 thereof and to return the ports 22 of the inner cylinder or sleeve to the inlet ports 20 of the outer cylinder.

The inner cylinder or sleeve and the parts contained therein are rotated as a unit through one-half of a revolution by means of a rack bar 36 and a pinion or gear 37 fixed to the end head 26. The rack bar 36, which is suitably guided, is connected at one end with the outer end of a piston rod 38 of a piston head 39 operating within a two-way air cylinder 40 connected at its ends by suitable pipe connections 41 and 42 with a four-way air control valve 43 which is connected by a pipe connection 44 with an air storage tank 45. The four-way air control valve, which may be of any conventional construction, is provided with a spring loaded valve stem 46 and is arranged above an endless mold conveyor 47 at one side thereof and adjacent the front end of the same, as clearly illustrated in Fig. 1 of the drawings. The valve stem which is provided at its lower end with a roller 48 to reduce wear, is moved in an upward direction by a cam projection 49 carried by each of the molds 10. The upward movement of the valve stem 46 through the four-way valve introduces compressed air to the two-way cylinder 40 and exhausts air from the other end of the same and thereby moves the piston and the rack bar 36 in one direction and rotates the pinion 37 one-half of a revolution and carries the ports 22 of the inner cylinder from the inlet ports at the top of the outer cylinder to the outlet ports at the bottom of the same. When the cam projection 49 is carried away from the valve stem the spring thereof moves the valve stem inwardly and through the four-way air control valve, exhausts from the cylinder 40 the air which has actuated the piston and introduces air into the other end of the cylinder 40 and returns the piston to its initial position. The pipe connection 44, which connects the air storage tank with the four-way air control valve, is provided with a manually operable valve 50 for cutting off the air from the storage tank to the valve 43.

The means for rotating the inner cylinder is located adjacent one end of the piston rod 35 which has its other end adjustably connected by a threaded sleeve 51 with a piston 52 of a two-way air cylinder 53 which is connected by pipe connections 54 and 55 with a four-way air control valve 56 having a spring loaded stem 57 and carrying a roller 58, the construction of the valve 56 being similar to that of valve 43. The four-way air control valve 56 is arranged in a vertical position above the endless mold conveyor at a point opposite the four-way air control valve 43, and it is adapted to be operated by cam projections 59 carried by each of the molds 10 at the right hand end thereof, as clearly illustrated in Fig. 2 of the drawings.

When the projection 49 at the left hand end of a mold actuates the air control valve 43, the piston in the air cylinder 40 moves forwardly, causing the inner cylinder of the depositor to revolve one-half turn, aligning the ports in the inner cylinder with the ports at the bottom of the outer cylinder. The cam projection at the right hand end of the mold is positioned so that immediately after the inner cylinder has been rotated one-half a revolution, it actuates the air control valve 56 causing the piston in the air cylinder 53 to move forwardly, driving the heads in the depositor against the intermediate cylinder heads, forcing the mix out of the depositor and into the mold which is in receiving position beneath the depositor. The cam projection 49 at the left of the mold then releases air control valve 43, causing the piston in the air cylinder 40 to move back, thereby rotating the inner cylinder or sleeve one-half of a revolution to re-align the ports in the inner cylinder with the ports at the top of the outer cylinder. The cam projection 59 at the right hand end of the mold then releases the air control valve 56, causing the piston in the air cylinder 53 to move back, carrying the piston heads within the depositor away from the intermediate cylinder heads, creating suction with draws more mix into the depositor, making it ready for the next cycle. The amount of mix deposited within the compartments of the depositor is controlled by regulating the back stroke of the piston rod 35 by means of the threaded sleeve 51 between said piston 52 and the piston rod 35. The mix depositor is provided with a drip cut wire 181 which is carried by the inner rotary cylinder in the turning movement thereof and which is adapted to sweep across the outlet ports of the outer cylinder while the same are open and a mold is open and is located below the mix depositor in position to receive a batch of mix. The drip cut wire, which may be of any desired gauge and which may be constructed of any other suitable material, such as a strip or ribbon of metal, extends lengthwise of the depositor. It is positioned 90° from the ports of the inner cylinder and is suitably secured at its ends to the collars carried by said inner cylinder. The drip cut wire is located adjacent one of the outturned ends 176 of the bracket 175 when the ports of the inner cylinder are located at the bottom of the depositor and in register with the outlet ports of the outer cylinder, and when the inner cylinder is partially rotated to carry its ports from the bottom outlet ports of the outer cylinder to the upper inlet ports thereof, the drip cut wire is carried from said outturned end 176 of the bracket 175 to the other outturned end thereof, sweeping across the outlet ports of the outer cylinder and in the reverse rotary movement of the inner cylinder the drip cut wire is again caused to sweep across the bottom outlet ports of the outer cylinder. The drip cut wire crosses and re-crosses the bottom outlet ports of the outer cylinder during the rotary movements of the inner cylinder for cleaning the outlet ports.

The endless mold conveyor which is disposed horizontally, comprises spaced sprocket chains 60 which are trained over front and rear sprocket wheels 61 and 62 mounted on transverse shafts 63 and 64 which are journaled in suitable bearings 65 of the main frame. The mold conveyor is actuated by a motor 66, preferably of the electric type, having a shaft 67 connected by a clutch 68 with the shaft 69 of a speed reducer 70 having a shaft 71 connected by sprocket gearing with the front transverse shaft 63. The sprocket gearing consists of a sprocket chain 72 of the roller drive type, trained over sprocket wheels 73 and 74 mounted on the shafts 63 and 71, as clearly illustrated in Figs. 1 and 2 of the drawings.

Figure 24:
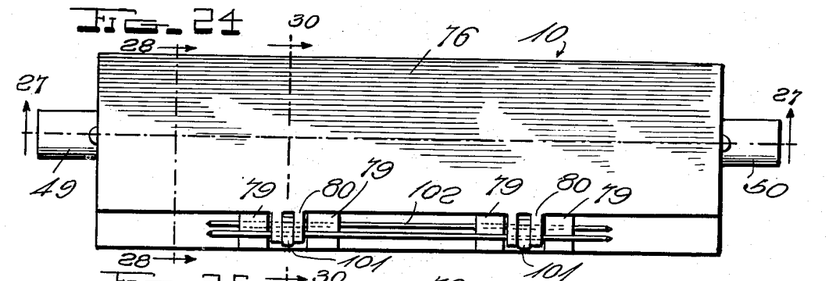
Fig. 24 is an enlarged detail plan view of one of the molds.
Figures 25, 26:
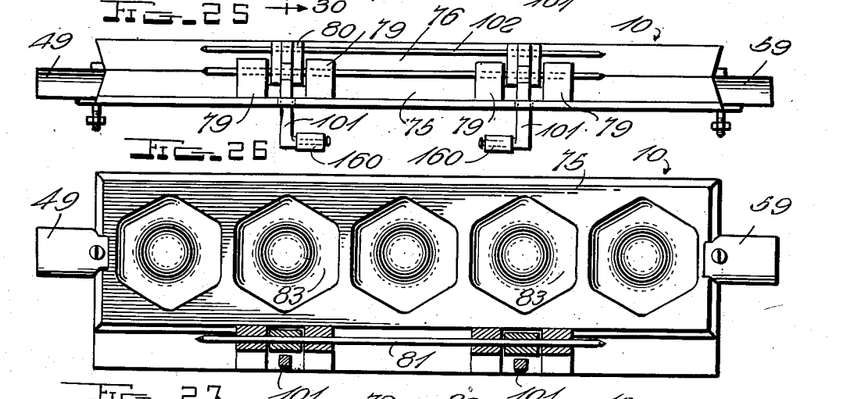
Fig. 25 is a side edge view illustrating the arrangement of the locking means of the mold.
Fig. 26 is a sectional view taken on the line 26—26 of Fig. 28.
Figures 27, 28, 29, 30, 31, 32:
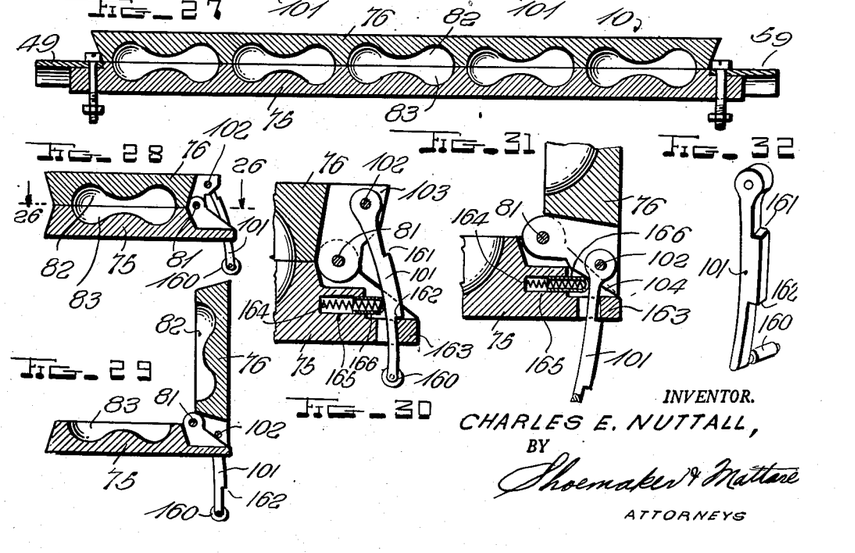
Fig. 27 is a sectional view taken on the line 27—27 of Fig. 24.
Fig. 28 is a sectional view taken on the line 28—28 of Fig. 24 showing the mold in closed position.
Fig. 29 is a similar view showing the mold in open position.
Fig. 30 is an enlarged detail sectional view taken substantially on the line 30—30 of Fig. 24 illustrating the position of the locking mechanism when the mold is closed.
Fig. 31 is a similar view illustrating the position of the locking means when the mold is open.
Fig. 32 is a detail perspective view of one of the latches.

The molds 10 each consist of a lower relatively fixed section 75 and an upper hinged section or cover 76. The lower section or base 75 of the mold is provided at its ends with lugs 77 and 78 which are suitably secured to links of the sprocket chains of the mold conveyor. The mold sections 75 and 76 are provided with spaced ears 79 and 80 through which passes a pintle rod 81 whereby the upper section or cover 76 is hinged to the lower section, 75. The mold sections 75 and 76 are provided with registering correspondingly shaped mold cavities 82 and 83. The mold cavities may be of any desired configuration for baking cakes or other products of the desired shape.

The major portion of the mold conveyor is arranged within an oven 84 having an insulated top or hood 85 provided at the rear end with a depending insulated wall 86 having a curved extension 87 at the lower end which forms the rear wall of the oven. The oven is provided with side walls 88 and a bottom wall 89 consisting of a horizontal plate extending forwardly from the curved extension 87, as clearly illustrated in Fig. 1 of the drawings. The hood of the oven is equipped with upper and lower heating elements 90 and 91 which may consist of gas burners. The upper and lower heating elements are connected with gas supply pipes 92 and 93 located below the upper and lower flights of the sprocket chains of the mold conveyor. The heating elements 90 and 91 which are located beneath the molds are arranged close to the same so that heat is absorbed by the molds as they are carried through the oven by the upper and lower flights of the sprocket chains of the mold conveyor. A temperature of approximately 350° F. is ample for baking purposes. Any other character or form of heating element may be employed.

The speed reduction gearing of the speed reducer is such that the molds move continuously at a slow speed which carries them from the filling point through the oven to the discharging point in approximately four minutes which is sufficient to properly and satisfactorily bake the mix contained within the molds. The insulated hood is provided at its rear portion with a vent opening 94 and fumes and also combustion gases resulting from the baking of the mix are vented through the opening by means of a vertical stack 95 having an enlarged lower portion 96 receiving a short vertical outlet 97 extending upwardly from the insulated hood at the opening 94. The stack 95 is provided in its enlarged portion 96 with an inverted V-shaped baffle 98 having downwardly diverging sides which terminate a short distance from the side walls of the enlarged portion 96 of the stack to provide passages 99 for the escaping fumes. The baffle, while permitting the escape of fumes to the stack, prevents a too great loss of heat from the oven and the baffle also prevents the gas flames from being extinguished by down drafts. Also, the enlarged portion 96 of the stack has its side walls spaced from the side walls of the outlet 97 which provides air passages and which cuts down the suction effect of the stack to prevent too great loss of heat from the oven. Any other suitable means may, of course, be provided for controlling the flow of air and fumes through the stack. The oven has an open front end and the insulated top wall or hood 85 is provided at its front end with a short depending portion 100 to assist in confining the heat within the oven.

The molds, after receiving the mix from the depositor, are carried into the open front end of the oven in an upright position with their covers closed by the upper flight of the mold conveyor and in passing around the rear sprocket wheels 62 of the mold conveyor are inverted, the covers being at the bottom and the body portion of the mold at the top, as clearly illustrated in Fig. 1 of the drawings. In order to lock the covers in their closed position and to retain them closed while the molds are traveling in an inverted position to the open front end of the oven by the lower flights of the sprocket chains of the mold conveyor, each mold is provided with a pair of latches 101 located at opposite sides of the center of the hinged side faces of the cover and the bottom section of the mold. The latches are similar in construction and a pair is provided in order to render the locking positive. The latches 101, which are arranged in a slightly inclined position, are pivoted at their upper ends, preferably by a continuous pivot rod 102 in recesses 103 of the cover of the mold, and they extend downwardly through recesses 104 in the lower section of the mold to a point below the mold and carry at their lower ends rollers 160 which reduces wear when they contact with latch tripping devices hereinafter described. Each latch is provided with oppositely facing upper and lower shoulders 161 and 162 which are adapted to engage a keeper 163 at the lower portion of the recess 104 for maintaining the cover of the mold in its open and closed positions. The keeper 163 preferably consists of an integral portion of the lower section of the mold and it bridges the recess 104 at the bottom thereof, but any suitable form of keeper for engagement by the latching portions of the latch 101 may, of course, be provided.

Each latch 101 is normally maintained in engagement with the keeper 163 by a coil expansion spring 164 mounted in a bore or socket 165 in the hinged side edge of the lower section of the mold and its outer portion is encased in a cartridge 166 which bears against the inner longitudinal edge of the latch. The spring permits the latch to be moved inwardly or backwardly and to be held in a retracted position and it operates to move the latch automatically back into its engaging position as soon as the latch is free to move. The lower engaging or latching portion of the latch 101 engages the upper face of the keeper 163 when the cover of the mold is closed and when the cover of the mold is open the latch 101 is moved longitudinally in a downward direction to carry its upper engaging or latching portion 161 into engagement with the lower face of the keeper, whereby the cover is maintained in an open position. The coil spring merely moves the latch into engagement with the keeper and is not subjected to the stress incident to holding the cover in its open or closed positions.

The rollers 160 extend laterally inwardly from the lower ends of the latches and when each mold is carried by the lower sprocket chain out of the front open end of the oven to a position above a cooling tray 105 the rollers 160 of the latches are engaged by a lower horizontal tripping plate or member 167 located in the path of the rollers and adapted to carry the latch engaging shoulder 162 out of engagement with the keeper 163 and release the inverted cover of the mold, which opens automatically by gravity and the baked contents of the mold are discharged into the cooling tray 105. Substantially simultaneously with the opening of the mold the engaged roller is carried out of engagement with the lower tripping member 167 and the latch is actuated by the coil spring 164 and the shoulder 161 engages the keeper 163 and latches the cover of the mold in its open position and maintains the mold in its open position as it is carried around the front sprocket wheel 61 and until it arrives at a point beneath the mix depositor and receives a batch of mix. The end portions of the lower tripping bar 167 form fingers for engaging the latches in the tripping operation thereof.

After the mold has received a batch of mix from the depositor it is carried toward the open front end of the oven and the open hinged section or cover 76 is engaged by a roller 106 which is located in the path of the open hinged section or cover, and as the mold passes beneath the roller the cover is closed. Substantially simultaneously with the engagement of the hinged cover 76 of the mold with the roller 106 the latch is tripped and the open cover is released by means of an upper vertically disposed tripping bar or member 168. The closing of the cover of the mold raises the latch 101 and the spring 164 moves the lower latch engaging shoulder 162 into engagement with the keeper 163 and the cover is locked in its closed position while it is being conveyed through the oven.

The lower tripping bar or member 167 is rigid with the lower end of a bracket 169 consisting of a vertical bar having its upper end 170 extended upwardly at an inclination and forming a support for a bowed snubber spring 171 curved longitudinally and extending downwardly at opposite sides of the bracket. The terminal portions of the snubber spring are located in the path of the rollers 160 of the latches and the spring which is deflected by said rollers 160 cushions the closing movement of the cover and prevents the same from slamming.

The bracket 169 is bolted or otherwise secured to the front wall 182 of a rectangular box or casing 183 which forms a combustion chamber 184. The front wall 182 of the combustion chamber also has mounted on it at opposite sides laterally spaced horizontally disposed studs 172 which slidably receive the upper latch tripping bar or member 168 and which also have mounted on them coil springs 173 interposed between the front wall 182 of the box or casing 183 and which yieldably urge the upper latch tripping bar or member 168 outwardly and enable the same to compensate for any misalignment of the latches of the mold and prevent any jamming of the parts. The end portions of the upper latch tripping bar 168 form fingers for engagement with the rollers 160 of the latches 101.

The box or casing which forms the combustion chamber is arranged between the sprocket chains of the mold conveyor and extends substantially from the rear transverse shaft 64 to within a short distance of the front transverse shaft 63 and is of a width substantially equal to the length of the molds. The said box or casing 183 may be constructed of sheet metal or any other suitable material and it is open at the top and it is drilled at one side for the gas burners and is provided at the opposite side with an air inlet opening 185 which coincides with an air inlet opening 186 of the adjacent side of the oven. The side walls of the box or casing 183 are also provided with slots 187 through which pass transversely disposed bars 188 which are secured to the main frame of the machine and which support the box or casing 183.

The oven encloses practically the entire conveyor assembly and the combustion chamber confines most of the heat to the desired area and concentrates the heat upon the bottoms of the molds carried by the upper flights of the mold conveyor chains. The box or casing also prevents $CO_2$ gas given off by the lower burners from snuffing the flames of the upper burners by by-passing said gas around the rear end of the combustion chamber. Fresh air for supporting combustion at the upper burners is obtained through the inlet openings 185 and 186 of the box or casing 183 and the side wall of the oven.

The four-way air control valve 56 is connected with the air storage tank 45 by a pipe connection 44$^a$ which is provided with a manually operable valve 50$^a$ for cutting off the air from the storage tank to the valve 56.

Compressed air is supplied to the air storage tank under a constant pressure by an air compressor 107 of any desired construction connected by a pipe connection 108 with the air storage tank 45 and operated by motor 66. Motion is communicated from the motor shaft 67 to the compressor shaft 109 by a belt 110 and pulleys 111 and 112 mounted, respectively, on the motor shaft 67 and the air compressor shaft 109. Any other suitable means may, of course, be employed for actuating the air compressor. The clutch 68 may be of any desired construction and any suitable means may be provided for manually operating the same. The clutch will enable the air compressor to be operated by the motor independently of the speed reducer and the conveyors.

Figures 9, 10, 11, 12:
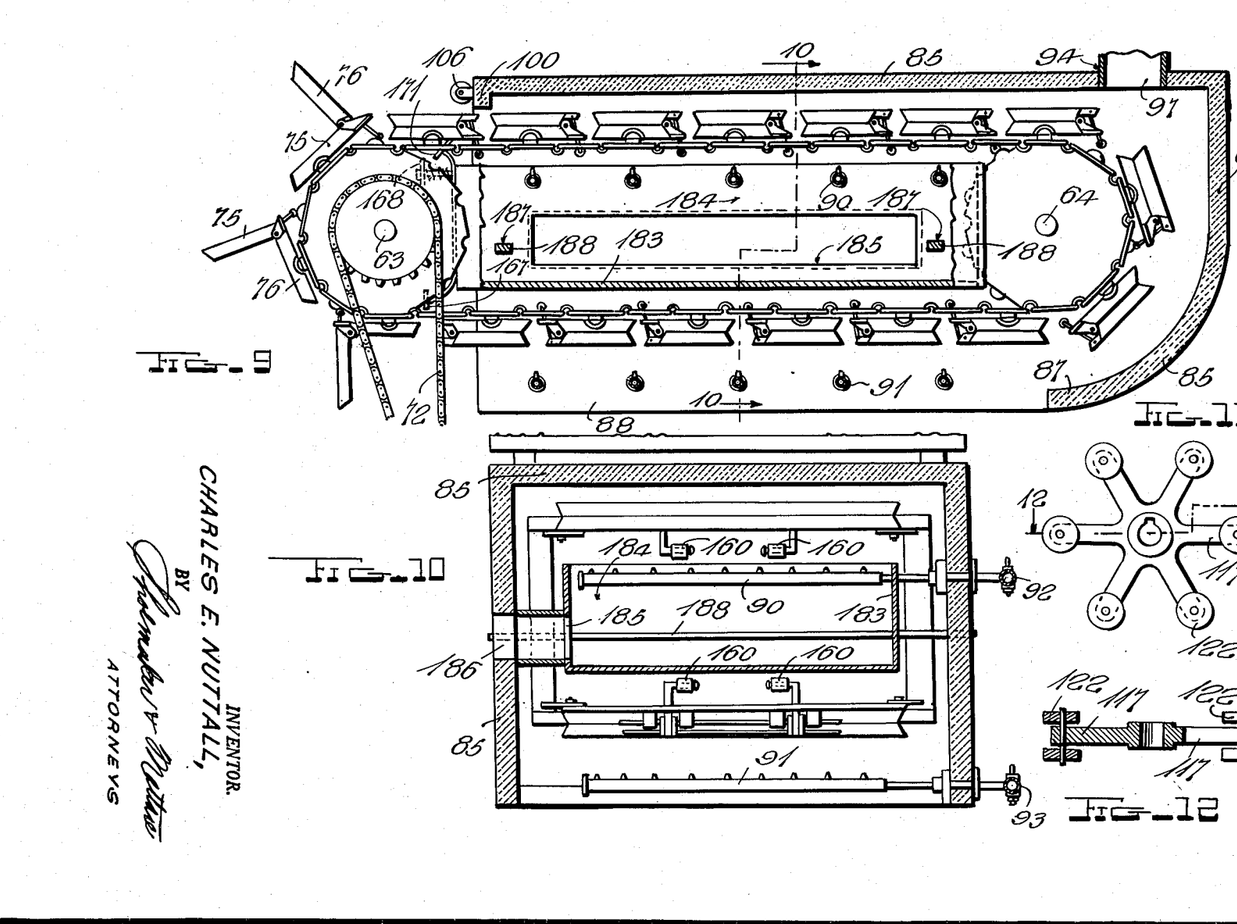
Fig. 9 is an enlarged detail sectional view taken longitudinally of the oven showing the molds in end elevation.
Fig. 10 is a transverse sectional view taken on the line 10—10 of Fig. 9.
Fig. 11 is a detail side elevation of the tray feeding wheel.
Fig. 12 is a sectional view of the same taken on the line 12—12 of Fig. 11.
Figure 13:
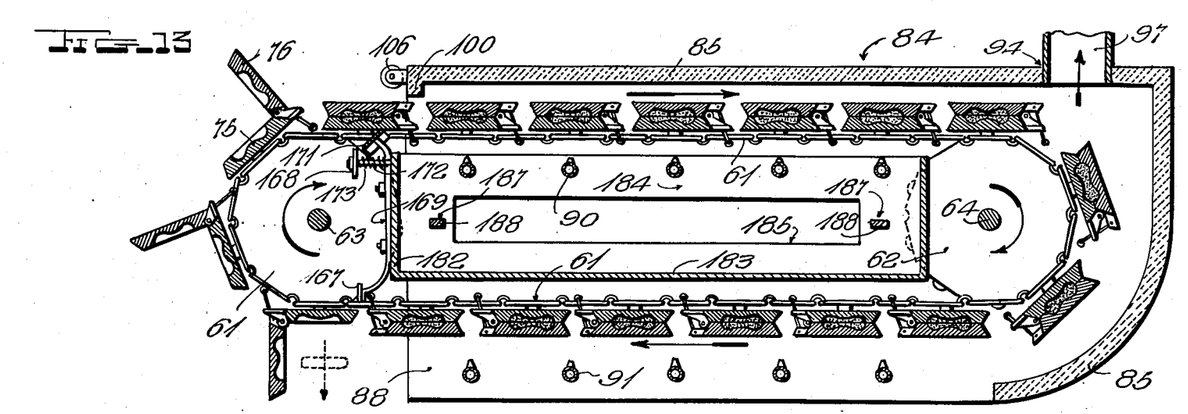
Fig. 13 is an enlarged longitudinal sectional view similar to Fig. 9, the molds being shown in section.
Figures 14, 15:
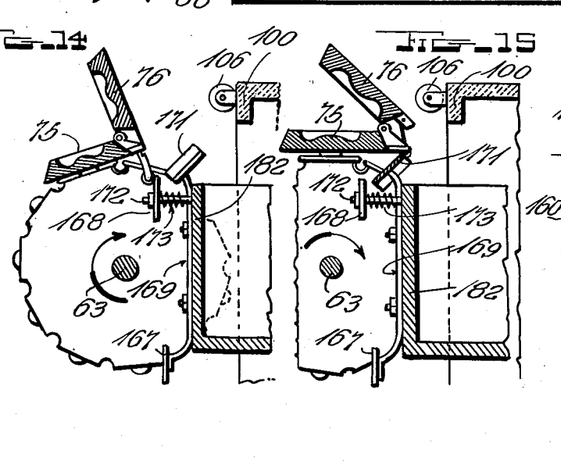
Fig. 14 is an enlarged detail sectional view showing one of the molds passing around the front end of the mold conveying means and in open position.
Fig. 15 is a similar view showing the mold released and in position to be locked in closed position preparatory to passing through the oven.
Figures 16, 17:
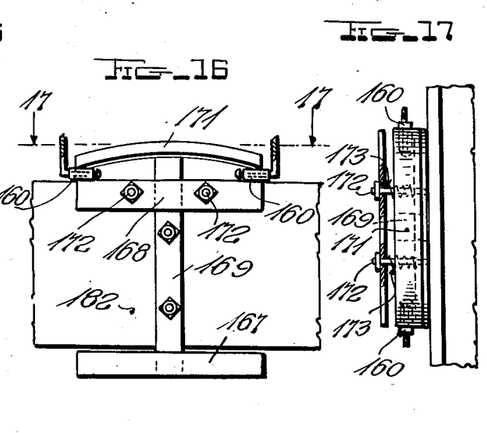
Fig. 16 is an enlarged detail elevation illustrating the upper and lower means for tripping the locking mechanism of the molds.
Fig. 17 is an enlarged detail sectional view taken substantially on the line 17—17 of Fig. 16.
Figures 18, 20, 21, 22:
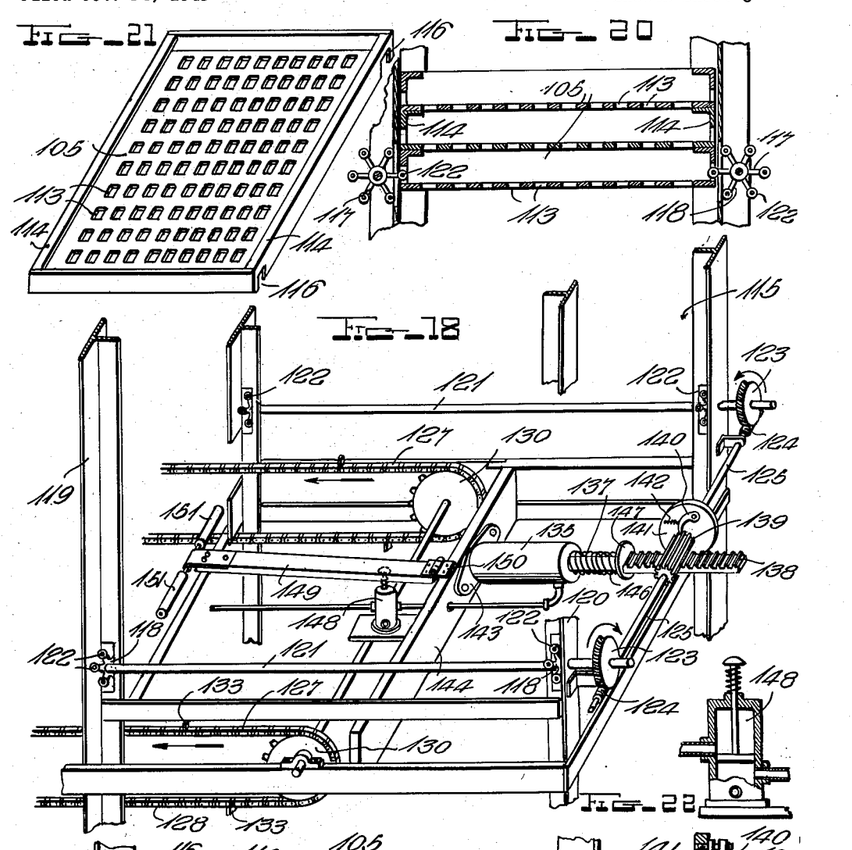
Fig. 18 is an enlarged detail perspective view of portions of the tray feeding mechanism.
Fig. 20 is an enlarged detail sectional view of the lower portion of the magazine showing the tray supporting and feeding means.
Fig. 21 is a detail perspective view of one of the cooling trays.
Fig. 22 is an enlarged detail sectional view showing the spirng return control valve of the tray feeding mechanism.

The cooling trays 105, which are rectangular, may be constructed of stainless steel or any other suitable material and are preferably of rigid one-piece construction having a bottom perforated with ⅜ inch square holes 113 with one-half inch between centers, lengthwise and crosswise. The openings may be of any other desired configuration, as will be readily understood. The sides are provided at the top with downwardly extending flanges 114 to prevent the trays from nesting when stacked in a magazine 115. The sides of the cooling trays are provided at each end with slots 116 extending approximately half way up the sides at each end of the tray, the slots being wide enough to receive teeth 117 of a tray feeding wheel 118. The magazine 115 is formed by corner uprights 119 and 120, the uprights 120 consisting of extensions of the uprights 14 of the main frame. The uprights 119 and 120 are preferably formed of metal T-shaped in cross section and the cooling trays are arranged in a vertical stack which rests at the corners of the lowermost tray upon the teeth 117 of the tray feeding wheels 118. The uprights of the magazine form a rack for the stack of trays and the T-shaped metal uprights form guides for the cooling trays of the stack which may consist of any desired number of trays. The tray feeding wheels which are mounted on parallel horizontal shafts 121 are six-toothed wheels provided at the ends of the teeth 117 with rollers 122 to take up wear. While the rollers 122 are shown mounted on the teeth of the tray feeding wheels 118 they may be mounted thereon in any other desired manner. As the tray feeding wheels 118 turn, the teeth successively extend about 3/8 of an inch into the slots in the corners of the trays. The shafts 121, which are located at opposite sides of the magazine, are journaled in suitable bearings of the uprights 119 and 120 and they are actuated by 6-to-1 worm gearing consisting of worm wheels 123 mounted on the shafts 121 and meshing with worms 124 of a transverse shaft 125 journaled in suitable bearings 126 mounted on the uprights 120. When the shafts 121 are rotated by the shaft 125, one tooth of each tray feeding wheel 118 moves from under the lowermost cooling tray and permits the same to drop upon an endless conveyor 127 which conveys the cooling trays from a point beneath the magazine to a receiving position at the front of the machine. As one tooth of each of the tray feeding wheels 118 moves from under the lowermost tray, the latter is fed downwardly and the next succeeding tooth moves into position for supporting the stack of trays until the next tray-feeding operation occurs.

The conveyor for the cooling trays is composed of endless chains 128 arranged on front and rear sprocket wheels 129 and 130 mounted upon transverse shafts 131 and 132 journaled in suitable bearings of the main frame. The sprocket chains of the cooling tray conveyor are provided at the outer faces of the links with vertical projections 133 adapted to extend into the holes at the bottom of the cooling trays for connecting the cooling trays to the conveyor, for positively conveying the trays forwardly to the front of the machine where the main frame is provided with a horizontal table 134 arranged to receive the trays as they are discharged from the tray conveyor. The vertical projections are preferably arranged at 10 inch intervals and are transversely aligned and the cooling tray conveyor extends beneath the magazine approximately half-way between the front and back thereof so that when a cooling tray is dropped from the magazine onto the cooling tray conveyor, only one pair of transversely aligned projections of the sprocket chains 120 will be presented to the trays so that the projections will positively engage perforations in the bottoms of the trays. Each tray is supported by the sprocket chains of the cooling tray conveyor and as it is advanced it will be engaged by a second set of projections. By successively engaging the transversely aligned projections with the perforations of the cooling tray it is easier and simpler than to simultaneously engage two sets or three sets of the projections with the perforations.

Figures 19, 23:
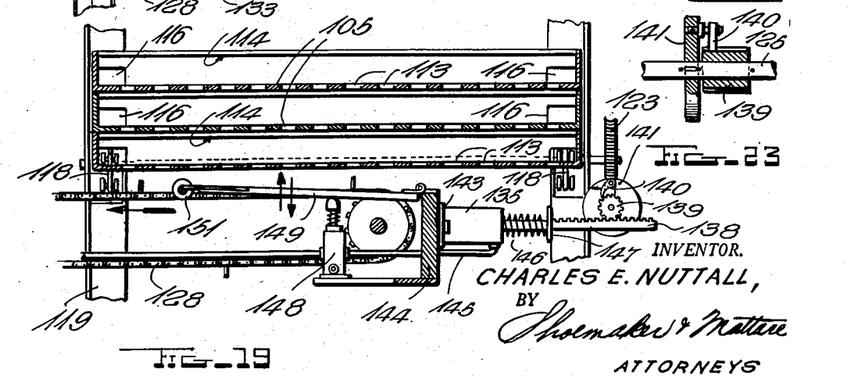
Fig. 19 is an enlarged detail sectional view showing portions of the cooling tray mechanism and the cooling tray tripping and feeding mechanism.
Fig. 23 is a detail sectional view illustrating the construction of the ratchet mechanism of the tray feeding mechanism.

The transverse worm shaft 125 is actuated by a one-way pull type air cylinder 135 having a piston rod 137 connected with and actuating a rack bar 138 which meshes with a pinion or gear 139 loose on the shaft 125 and engaged by a pawl 140 pivoted to a rotary member 141 fixed to the shaft 125. The rotary member 141 is preferably in the form of a disk or wheel and the pawl 140 is actuated by a spring 142 which maintains the pawl 140 in engagement with the gear or pinion 139. The one-way air pull cylinder, which is arranged horizontally, is provided at one end with an attaching portion 143 secured to a transverse frame member 144. The other end of the cylinder 135 is connected by a pipe connection 145 with the air storage tank 45 and when air is admitted into the cylinder 135 the piston rod 137 is moved inwardly or forwardly and the rack bar 138 rotates the gear or pinion 139 which is engaged by the pawl 140 and which carries with it the rotary member 141 and the shaft 125. This results in the rotation of the shafts 121 and the tray feeding wheels 118 and the dropping of the bottom cooling tray onto the conveyor. When the piston 137 is free to move, it is moved outwardly or rearwardly and returned to its initial position by a coil spring 146 disposed on the piston and interposed between the rear end of the cylinder 135 and a collar or flange 147 provided at the rear end of the piston. The rack bar 138 is suitably secured to the outer end of the piston rod and may be guided by any suitable means.

The passage of compressed air from the storage tank to the one-way pull cylinder is controlled by a control valve 148 operated by a lever arm 149 hinged at one end 150 to the frame member 144 and arranged horizontally approximately in the plane of the upper flights of the sprocket chains of the cooling tray conveyor in position to be engaged and actuated by a tray fed from the magazine onto the cooling tray conveyor. The lever arm 149 is provided at its free end with laterally extending rollers 151 and the lever arm is located above the stem of the air control valve 148 and is adapted to be moved downwardly and operated by a tray dropped from the magazine. The air control valve 148 is a spring returned valve and its piston is moved outwardly by a spring in the usual manner which also raises the lever arm 149. When a deposited tray is carried forward by the tray conveyor the rollers 151 at the free end of the lever arm 149 clear the bottom of the tray, permitting the arm to rise and the air control valve 148 to open. Compressed air enters the cylinder 135 pulling the rack bar 138 inwardly and rotating the spur gear or pinion 139 and the shaft 125 forwardly. The transverse shaft 125 and the worms 124 rotate one complete revolution and turn the tray feeding wheels the distance of one tooth, causing the tray feeding wheels to release the bottom tray and engage the succeeding tray. The released bottom tray drops onto the tray conveyor and is engaged by the chain projections which extend through the perforations in the bottom of the tray. The weight of the tray holds down the lever arm, closing the air control valve and exhausting air from the cylinder 135. The spring 146 moves the piston 137 and the rack bar 138 outwardly, returning the same to their initial positions without rotating the shaft 125 as the pawl ratchets over the spur pinion or gear 139. This completes the cycle and readies the machine for the next tray. The cooling tray conveyor is actuated by the roller drive chain 72 which meshes with a sprocket wheel 153 mounted on and fixed to the front shaft 131 of the cooling tray conveyor 127.

I claim:

1. A cake baking machine including a horizontally disposed endless mold conveyor comprising laterally spaced sprocket chains and sprocket wheels meshing with and supporting the chains, molds secured to the links of the conveyor chains and having hinged covers and carried in an upright position by the upper flights of the sprocket chains and in an inverted position by the lower flights of the sprocket chains, latches pivotally mounted on the hinged covers of the molds and having latching portions arranged to lock the covers of the molds in their closed and open positions and projecting beyond the molds, upper and lower tripping fingers arranged to engage the latches to release the same to permit the covers to close and also to permit the covers to open when the molds are in an inverted position for discharging their contents and for causing the latches to lock the covers of the molds in an open position to receive a batch of mix, and a snubber arranged to be engaged by the latches for cushioning the closing movement of the covers to prevent the same from slamming.

2. A cake baking machine including a horizontal oven open at one end and closed at the other, an endless horizontally disposed mold conveyor extending into the oven and throughout substantially the length of the same and comprising laterally spaced sprocket chains and sprocket wheels meshing with and supporting the chains, a substantially rectangular casing located between the sprocket chains and forming a combustion chamber, molds secured to the links of the conveyor chain and having hinged covers and carried into the oven in an upright position by the upper flights of the sprocket chains and out of the oven in an inverted position by the lower flights of the sprocket chains, latches mounted on the covers of the molds and having latching portions arranged to lock the covers of the molds in their closed and open positions, a bracket secured to the front wall of the casing and provided with lower fingers arranged to trip the latches to open the molds for discharging their contents and adapted to engage the open covers for locking the same in an open position, studs mounted on the front wall of said casing, an upper tripping device slidably mounted on the studs and forming fingers for engaging the latches to release the covers of the molds to permit the same to close, means for yieldably urging the upper tripping device outwardly on said studs, a snubber spring carried by said bracket and arranged to be engaged by the latches for preventing the covers in their closing movements from slamming, and means for positively closing the covers of the molds.

CHARLES E. NUTTALL.

REFERENCES CITED

The following references are of record in the file of this patent:

UNITED STATES PATENTS

| Number | Name | Date |
|---|---|---|
| 398,584 | Crandell | Feb. 26, 1889 |
| 967,147 | Trewick | Aug. 9, 1910 |
| 990,577 | Mayle et al. | Apr. 25, 1911 |
| 997,554 | Holmes | July 11, 1911 |
| 1,171,447 | Lawhead | Feb. 15, 1916 |
| 1,238,544 | McGowan | Aug. 28, 1917 |
| 1,303,128 | Takahashi | May 6, 1919 |
| 1,303,218 | Esselmann | May 6, 1919 |
| 1,333,781 | Shaut | Mar. 16, 1920 |
| 1,345,079 | Fisch | June 29, 1920 |
| 1,501,494 | Matsuo | July 15, 1924 |
| 1,823,151 | Lanier | Sept. 15, 1931 |
| 1,880,753 | Brand | Oct. 4, 1932 |
| 2,089,385 | Llewellyn | Aug. 10, 1937 |
| 2,291,097 | Mooney | July 28, 1942 |
| 2,462,021 | Harker | Feb. 15, 1949 |

FOREIGN PATENTS

| Number | Country | Date |
|---|---|---|
| 30,760 | Netherlands | Sept. 15, 1933 |
| 270,862 | Great Britain | May 19, 1927 |